(12) United States Patent
Malegaonkar et al.

(10) Patent No.: US 8,811,383 B2
(45) Date of Patent: Aug. 19, 2014

(54) COMMUNICATION SYSTEM AND METHOD

(75) Inventors: Rahul Malegaonkar, Santa Clara, CA (US); Scott Petrack, Palo Alto, CA (US)

(73) Assignee: Skype, Dublin (IE)

( * ) Notice: Subject to any disclaimer, the term of this patent is extended or adjusted under 35 U.S.C. 154(b) by 145 days.

(21) Appl. No.: 13/338,407

(22) Filed: Dec. 28, 2011

(65) Prior Publication Data

US 2013/0170401 A1 Jul. 4, 2013

(51) Int. Cl.
*H04L 12/28* (2006.01)
*H04L 12/64* (2006.01)
*H04L 12/16* (2006.01)

(52) U.S. Cl.
USPC .......................... 370/352; 370/259; 370/401

(58) Field of Classification Search
USPC .......... 370/254, 352, 401, 902; 709/206, 228; 379/88.17, 900
See application file for complete search history.

(56) References Cited

U.S. PATENT DOCUMENTS

| 8,180,026 | B2* | 5/2012 | MacIsaac | 379/88.21 |
|---|---|---|---|---|
| 2004/0225499 | A1* | 11/2004 | Wang et al. | 704/257 |
| 2007/0238472 | A1* | 10/2007 | Wanless | 455/461 |
| 2008/0056235 | A1* | 3/2008 | Albina et al. | 370/352 |
| 2008/0133580 | A1* | 6/2008 | Wanless et al. | 707/102 |
| 2008/0298348 | A1 | 12/2008 | Frame et al. | |
| 2009/0016368 | A1* | 1/2009 | Lowekamp | 370/401 |
| 2010/0303061 | A1* | 12/2010 | Wan et al. | 370/352 |
| 2011/0029647 | A1 | 2/2011 | Ginevan et al. | |
| 2011/0167165 | A1* | 7/2011 | Bryan | 709/230 |
| 2011/0235790 | A1* | 9/2011 | Strope et al. | 379/93.02 |

FOREIGN PATENT DOCUMENTS

| CN | 101150870 | 3/2008 |
|---|---|---|
| CN | 101675649 | 3/2010 |
| EP | 1646210 A1 | 4/2006 |

OTHER PUBLICATIONS

"International Search Report", Mailed Date: Apr. 3, 2013, Application No. PCT/US2012/072021, Filed Date: Dec. 28, 2012, pp. 12.
"Foreign Office Action", CN Application No. 201210582331.1, Feb. 8, 2014, 15 pages.

* cited by examiner

*Primary Examiner* — Ahmed Elallam
(74) *Attorney, Agent, or Firm* — Sonia Cooper; Jim Ross; Micky Minhas

(57) ABSTRACT

A method of placing an outgoing communication event to a destination phone number is disclosed. Accordingly, upon receiving a notification of the outgoing communication event, a determination is made if the destination phone number is associated with a user of a first network. The first network is a packet based communication network. A user identification of the user of the first network corresponding to the destination phone number is then retrieved. A presence information of a communication node in the first network associated with the user is also retrieved. The presence information is an indication of the user's availability. The communication node is configured to receive voice communication events. The outgoing communication event to the communication node associated with the user in the first network is placed based on the retrieved presence information.

21 Claims, 3 Drawing Sheets

COMMUNICATION SYSTEM AND METHOD

BACKGROUND OF THE INVENTION

1. Field of the Invention

Embodiments of the present invention relate generally to real time communication and more particularly initiating and terminating phone calls within or across different telephony networks.

2. Description of the Related Art

Some communication systems allow the user of a device, such as a personal computer, to communicate across a packet-based computer network such as the Internet. Such communication systems include voice over internet protocol ("VoIP") communication systems. These systems are beneficial to the user as they are often of significantly lower cost than conventional fixed line or mobile networks. This may particularly be the case for long-distance communication. To use a VoIP system, the user installs and executes client software on her/his device. The client software provides the VoIP connections as well as other functions such as registration and authentication. In addition to voice communication, the client may also provide further features such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider (or a third party vendor) on their computer (which includes any supported computing device, including smart phones), and register with the P2P system. When the user registers with the P2P system, the client software is provided with a digital certificate from a server. Once the client software has been provided with the certificate, then calls or other communications can subsequently be set up and routed between users of the P2P system without the further use of a server in the set-up. Instead, the client looks up the required IP addresses from information distributed amongst the P2P client software on other end users' computers within the P2P system. Once the IP address of a callee's terminal has thus been determined, the caller's P2P client software then exchanges certificates with the callee's P2P client software. The exchange of the digital certificates (or user identity certificates, "UIC") between users provides proof of the users' identities and that they are suitably authorized and authenticated in the P2P system. Therefore, the presentation of digital certificates provides trust in the identity of the users. It is therefore a characteristic of peer-to-peer communication that, once registered, the users can set up their own communication routes through the P2P system in a decentralized manner based on distributed address look-up and the exchange of one or more digital certificates, without using a server for those purposes. Further details on such a P2P system are disclosed in WO 2005/008524 and WO 2005/009019. VoIP or other packet-based communications can also be implemented using non P2P systems that do use centralized call set-up.

The P2P system typically allows calling PSTN or mobile numbers from the P2P client software. However, when a PSTN or a mobile phone number is called from the caller's P2P client software, the P2P system routes the call to the PSTN or Mobile network. What is needed are systems and methods to route the calls from a packet based network to the PSTN or mobile network (or vice versa) to reduce cost and improve quality of service.

SUMMARY OF THE INVENTION

In one embodiment, a method of placing an outgoing communication event to a destination phone number is disclosed. Accordingly, upon receiving a notification of the outgoing communication event, a determination is made if the destination phone number is associated with a user of a first network. The first network is a packet based communication network. A user identification of the user of the first network corresponding to the destination phone number is then retrieved. A presence information of a communication node in the first network associated with the user is also retrieved. The presence information is an indication of the user's availability. The communication node is configured to receive voice communication events. The outgoing communication event to the communication node associated with the user in the first network is placed based on the retrieved presence information.

In another embodiment, a communication system is disclosed. The communication system includes a plurality of end user terminals connected to a first network, a gateway coupled to the first network and a second network for interfacing the first network with the second network, and a communication server. At least one of the communication server and at least one of the plurality of end user terminals is configured to perform an operation of placing an outgoing communication event to a destination phone number. Accordingly, the operation includes, upon receiving a notification of the outgoing communication event, determining if the destination phone number is associated with a user of a first network. The first network is a packet based communication network. A user identification of the user of the first network corresponding to the destination phone number is then retrieved. A presence information of a communication node in the first network associated with the user is also retrieved. The presence information is an indication of the user's availability. The communication node is configured to receive voice communication events. The outgoing communication event to the communication node associated with the user in the first network is placed based on the retrieved presence information.

In yet another embodiment, a computer readable storage medium containing a program which, when executed, performs an operation of placing an outgoing communication event to a destination phone number, is disclosed. Accordingly, the operation includes, upon receiving a notification of the outgoing communication event, determining if the destination phone number is associated with a user of a first network. The first network is a packet based communication network. A user identification of the user of the first network corresponding to the destination phone number is then retrieved. A presence information of a communication node in the first network associated with the user is also retrieved. The presence information is an indication of the user's availability. The communication node is configured to receive voice communication events. The outgoing communication event to the communication node associated with the user in the first network is placed based on the retrieved presence information.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
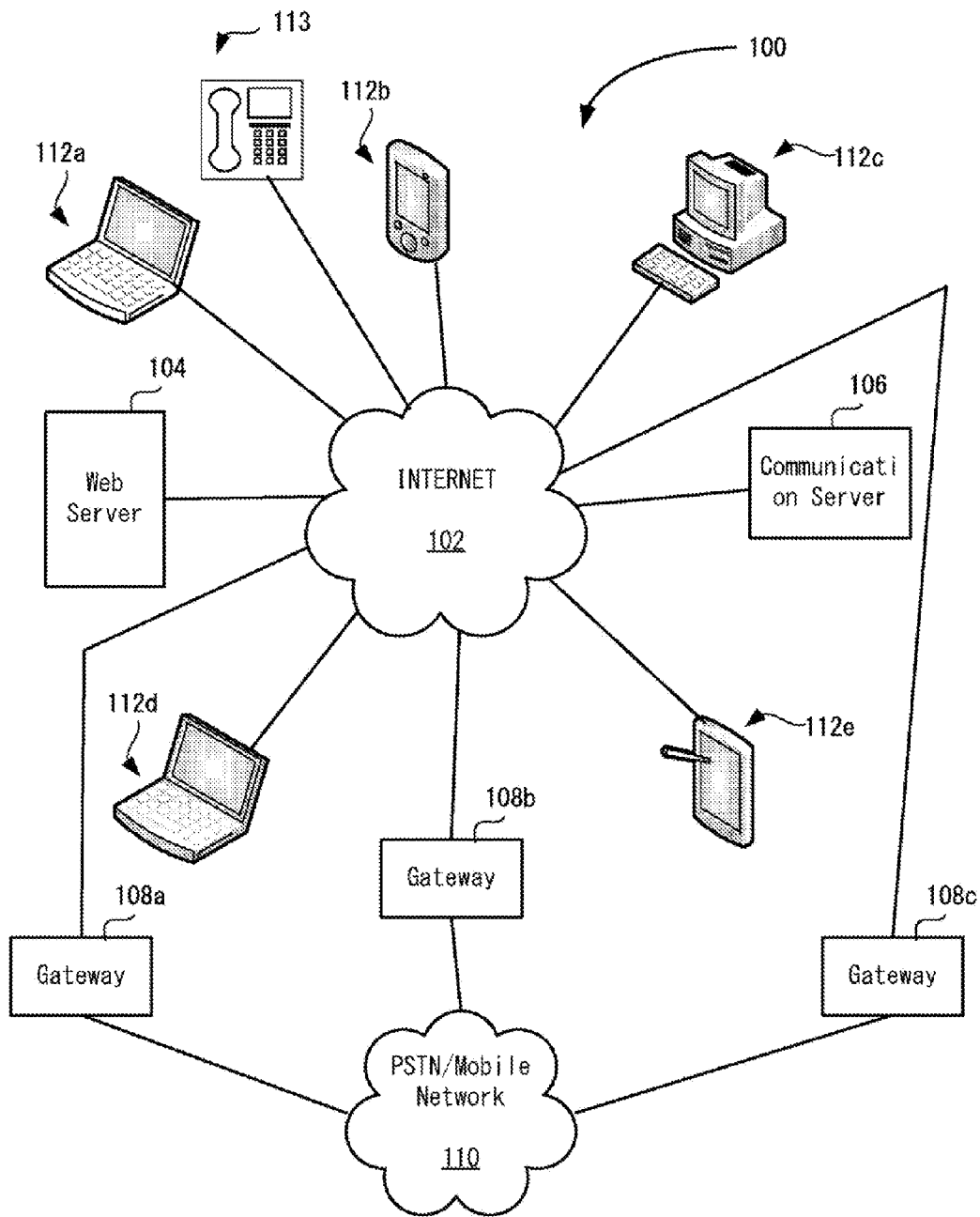
FIG. 1 illustrates a schematic depiction of a communication system based on the Internet, according to one embodiment of the present invention.

FIG. 1 is a schematic illustration of a communication system 100. The communication system 100 includes at least a packet-based network such as the Internet 102, which comprises one or more of a plurality of interconnected elements such as a laptop computer 112a, 112d, a mobile phone 112b, a desktop computer 112c, a tablet computer 112e and a Web server 104. One more telephony gateways 108a, 108b, 108c may also be included to route telephone calls to PSTN or mobile network 110. In one embodiment, if more than one gateway is included in the communication system 100, at least some of the gateways may be located in different geographical locations according to telephone calling areas. Some gateways may also be located in different countries. At least some of network elements are inter-coupled with the rest of the Internet 102, and is configured to communicate data with other such elements over the Internet by transmitting and receiving data in the form of Internet Protocol (IP) packets. Each element that is coupled to the Internet 102 also has an associated IP address locating it within the Internet. A communication server 106 (such as a P2P server) may be included in the communication system 100. Other end-user terminals (e.g., laptop computers, desktop computers, smart phones, tablet computers, etc.), servers and gateways, as well as routers of Internet service providers (ISPs) and Internet backbone routers, etc. may also be included in the communication system 100. A Voice Over IP (VoIP) landline phone 113 may also be coupled to the Internet 102. The VoIP phone is configured to communicate with the communication server 106.

In one embodiment, each of a plurality of the end-user terminals includes communication software comprising a P2P client application or a communication client application, which may also include features for calling phone numbers from the end-user terminal. When executed, the P2P client application allows the end user terminals (e.g., 112a . . . e) to establish bidirectional communication channels with other such end-user terminals or PSTN phones via the Internet using P2P call set-up (or more generally connection set-up). In one embodiment, the communication client applications also share presence information with one another, which provides an availability status of users. The presence information for each user is preferably at least in part defined by the users themselves. To supplement the decentralized call set-up, the communication client application may retrieve some additional information from a communication server 106, such as contact lists which provide the names of the users' contacts, "avatars" which are images chosen by users to represent themselves within the communication server 106.

A communication application may also be installed at the gateways 108a coupled to both the Internet 102 and a PSTN network and/or a mobile cellular network 110. This allows the communication client applications (e.g., P2P client applications or VoIP client applications) running on the end-user terminals 112a-e to communicate with ordinary land-line telephones (i.e., PSTN phones) and/or mobile telephones respectively, even if those telephones themselves do not run communication client applications and are not directly coupled to the Internet 102. In that case, the communication client application on the end user terminals 112a-e sets up a connection over the Internet with the communication client application on the gateway 108a using P2P call set-up and provides it with a phone number, and the gateway 108 uses the phone number to set up a connection with the telephone over the PSTN or/and mobile network 110.

In one embodiment, if a particular end-user terminal 112a does not have an associated phone number, either the gateway 108a (or 108b or 108c) or the communication server 106 may assign a temporary outgoing identity (e.g., a caller identification number) prior to setting up a call to a phone number in the PSTN or mobile network 110. In one embodiment, the temporary phone number may be a random number or word or preconfigured by the user or by the communication server 106. In other embodiments, a user id or a number generated based on the user id of the user of an end-user terminals may be used as the outgoing identity.

In another embodiment, the communication client application 214 may retrieve from a network node and cache contact information of one or more contacts of a user of the communication client application 214. The network node may be a server in the Internet 102 that stores contact information of all or a subset of users of the communication network associated with the communication client application 214. When the user enters a phone number in the communication client application 214, the communication client application 214 searches in the contact list for a communication network user identification that is associated with the entered phone number. For example, if the user dials the phone number "6505551212," the communication client application 214 searches through the locally stored or cached list of contacts to determine if this number is associated with any contact in the locally stored contact list. If a matching contact is found, the communication client application 214 then further determines if the found contact also includes a user identification associated with the communication network to which the communication client application 214 is connected.

If the user identification is found, the communication client application 214 attempts to retrieve presence information from a communication node associated with the found user identification in the communication network. If the retrieved presence information indicates that the user of the communication node associated with the found user identification is available and configured to receive calls through the communication node, the communication client application 214 places a call to the communication node using the communication network, instead of placing a call to initially entered phone number in a second network.

In another embodiment, if no contact is found in the locally stored contact list, the communication client application 214 attempts to query the communication server 106. If the communication server 106 returns the user identification of corresponding to the entered phone number, the communication client application 214 uses to the user identification to place a call to the communication node associated with the user identification based on the presence information, as described in the preceding paragraph. Alternatively, the communication client application 214 may place the call to the entered number. The call is received at the gateway 108a-c or the communication server 106, which then attempts to find a communication network user identification corresponding to the entered number. If the user identification is found, the call is placed to the communication node associated with the user identification in the communication network, based on the retrieved presence information.

A call may also be placed from a device in the second network to a destination phone number. In this case, if the call is received at the gateway 108a-c or the communication server 106, at least one of the communication server 106 and the gateway 108a-c determine the user identification associated with the destination phone number and may perform the above described process of placing the call to the communication node associated with the user identification. Note that, in one of more embodiments, retrieving the presence information may also include retrieving user configuration information from the communication node associated with the user identification.

Figure 2:
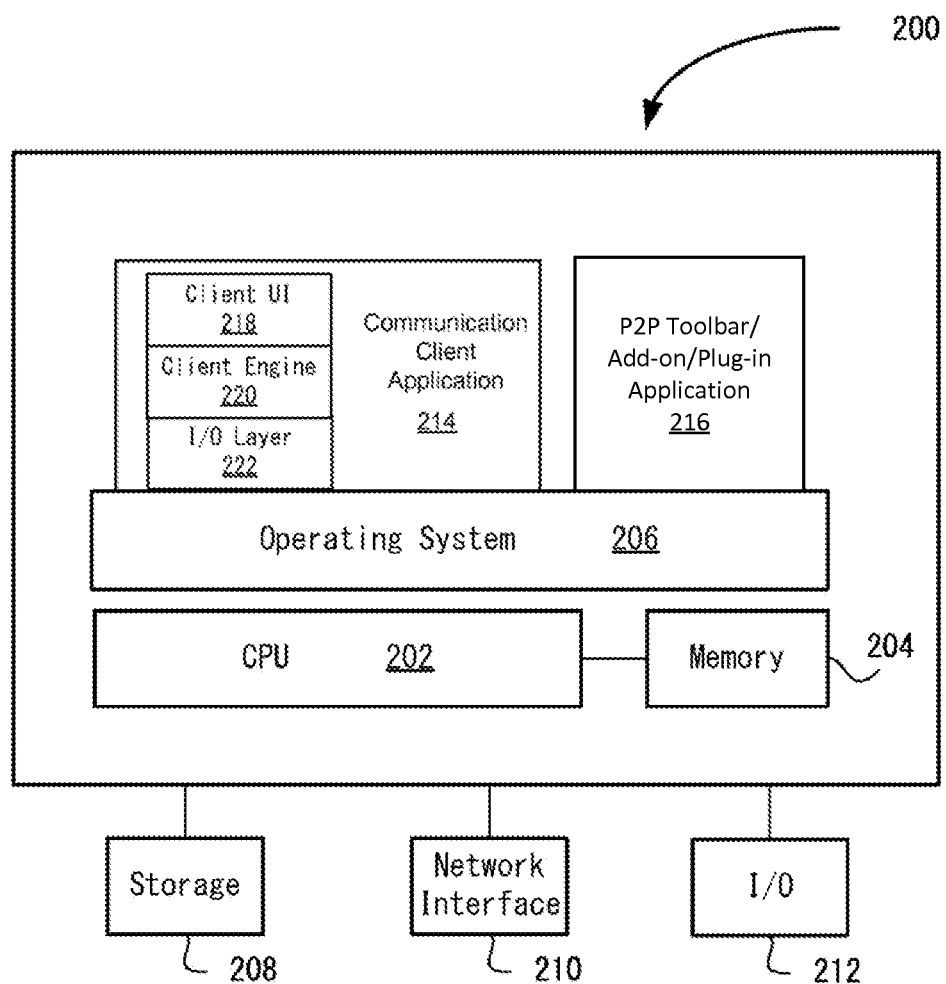
FIG. 2 is a logical diagram of an end user terminal, according to one embodiment of the present invention.

The schematic block diagram 200 of FIG. 2 shows an end-user terminal 112a, which is configured to act as a terminal of a communication system operating over the Internet 102. The end user terminal 112a comprises a CPU 202 operatively coupled to a network interface 210, such as modem, wireless adapter, LAN adapter, etc. for connecting to the Internet 102, a non-volatile storage device 208, such as a hard-drive or flash memory, and a volatile memory device such as a random access memory (RAM) 204. The end-user terminal 112a also comprises one or more user input devices, for example in the form of a keyboard, mouse, microphone and webcam, each operatively coupled to the CPU 202 via an I/O interface 212. In some embodiments, the keyboard and/or the mouse may be implemented in software and may execute cooperatively with an operating system 206, without the I/O interface 212. The end-user terminal 112a further comprises one or more user output devices, for example in the form of a display screen and speaker, again each operatively coupled to the CPU 202. The storage device 208 stores software including at least the operating system (OS) 206 and a packet-based communication software comprising a communication client application 214 that includes a Client UI 218, a Client Engine 220 and an I/O Layer 222. On start-up of the end-user terminal 112a, the operating system software 206 is automatically loaded into the RAM 204 and from there is executed by the CPU 202. Once running, the operating system 206 can then run applications such as P2P client application 214 by loading them into the into the RAM 204 and executing them on the CPU 202.

In one embodiment, the communication client application 214 comprises three basic layers: an input and output 222, a client engine layer 220, and a user interface (UI) layer 218. However, in other embodiments, other layers may be added or some of the above three may be omitted or two or more layers may be merged together. The communication client application 214 and P2P toolbar/add-on/plug-in application 216 is executed within the operating system 206. This means that in a multi-tasking environment they are scheduled for execution by the operating system 206; and further that inputs to the I/O layer 222 of the communication client application 214 from the input devices as well as outputs from the I/O layer 222 of the communication client application 214 to the output devices may be mediated via suitable drivers and/or APIs of the operating system 206.

In one embodiment, the I/O layer 222 of the communication client application comprises audio and/or video codecs which receive incoming encoded streams and decodes them for output to the speaker (not shown) and/or display (not shown) as appropriate, and which receive un-encoded audio and/or video data from the microphone (not shown) and/or webcam (not shown) and encodes them for transmission as streams to other end-user terminals 112a-e of the communication system 100. The I/O layer 222 may also comprises a control signaling protocol for signaling control information between end-user terminals 112a-e of the Internet 102. The client engine 220 then handles the connection management functions of the communication system 100 as discussed above, such as establishing calls or other connections by P2P address look-up and authentication. The client engine 220 may also be responsible for other secondary functions of the communication system such as supplying up-to-date contact lists and/or avatar images of the user to the communication server 106 within the communication system 100 or retrieving up-to-date contact lists of the user and retrieving up-to-date avatar images of other users from the P2P server 106. Further, the client engine 220 retrieves presence information from the other clients of the users in the contact list via a public API, and reciprocally provide its own presence information to those other clients that are online, Exchange of presence information directly between clients via a public API is the preferred option, but alternatively the presence information could be exchanged via an intermediate node such as the communication server 106. The presence information includes the status of a selected end user terminal. For example, the presence information may include whether the end user terminal is online, busy, configured to accept phone calls, in do-not-disturb mode, etc. Some presence information may include both system generated and user generated information.

The UI layer 218 is responsible for presenting decoded video to the user via the display, for how to arrange the presented output on the display along with user controls such as buttons and menus, and for receiving inputs from the user via the presented controls.

Figure 3:
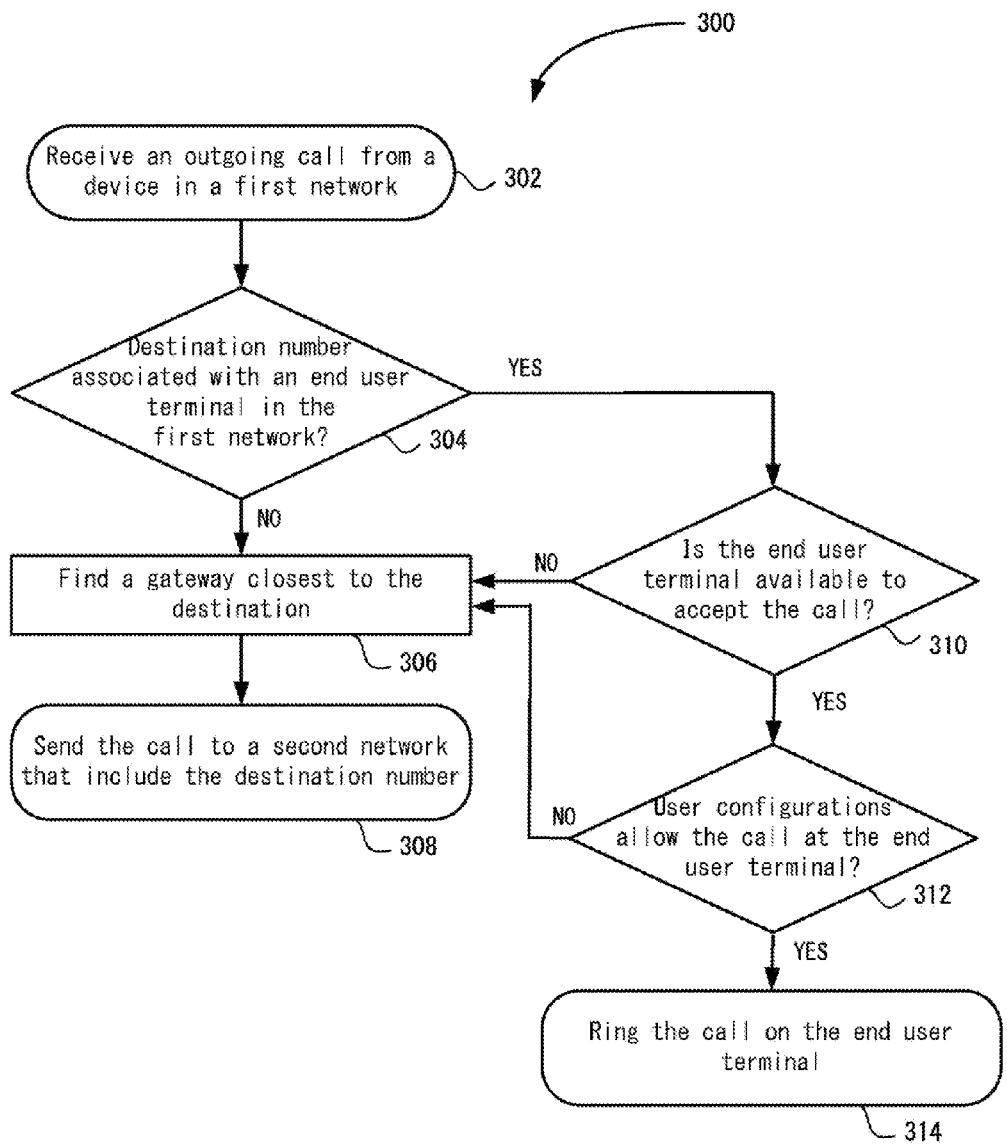
FIG. 3 illustrates an exemplary process of initiating a phone call from one network to another, according to one embodiment of the present invention.

FIG. 3 illustrates a process 300 for terminate a call that originates in a first network (e.g., the Internet 102) to another network (e.g., the PSTN or mobile network 110) if certain conditions are met. The process may be performed at the P2P server 106 or at one more gateways 108a, 108b, 108c. In another embodiment, the gateways and the P2P server 106 may cooperatively perform the process steps. In yet another embodiment, the end-user station 112a that originates the call may also cooperatively participate to perform some steps of the process 300.

Accordingly, at step 302, an outgoing call is received from the end-user terminal 112a (or any other end user terminal in a first network that is communicatively coupled to the Internet 102 and the communication server 106). In another embodiment, only a notification that a particular end-user station is attempting to make a call, is received instead of the outgoing call itself. At decision step 304, a determination is made whether the destination phone number is in the first network. Such determination may be made by querying a database that consists of associated phone numbers of all registered end user terminals in the first network. It may be noted that not all registered end user stations may have associated phone numbers. In one embodiment, the communication server 106 maintains this database in the local cache. In other embodiment, the database may be maintained on an independent server that is accessible from the P2P server 106. The database may also be accessible from the gateways 108*a-c*. In yet another embodiment, the source end user station may also query the database directly prior to initiating the phone call.

If the destination number is not in the first network, at step 306, if there are more than one gateways 108*a-c* are present, in one embodiment, a gateway that is graphically closest to the location of the called number is selected. The graphical closeness may also be determined based on tariff rates between each gateways and the called number. For example, if the called number is located in the UK, a gateway that is local to the UK may be selected. In other embodiments, a gateway may be selected based on load balancing, relative availability, etc. At step 308, the call is transferred to the second network in which the called number is found. The call may be transferred to the second network through a selected gateway, accordingly to step 306.

If at step 304, if the called phone number is found to be in the first network, at decision step 310, a determination is made whether the end user terminal associated with the called phone number is available to accept phone calls. Such determination can be made based on the presence information of the destination end user terminal. For example, if the presence information provides that the end user terminal is in the "Do Not Disturb" mode, or the status is "Away" or the status is "Busy," etc., the destination end user station may be considered as not available for accepting calls. However, in other embodiments, a user may configure the end user terminal to accept or reject calls in different user defined conditions. For example, the user may configure the end user terminal to accept calls in the "Busy" state, etc. Other configurations may include to identify whether microphone and speakers of the end user terminal are available and functioning property.

If at decision step 310, the end user terminal is found to be not available to accept incoming phone calls, the control is passed to step 306. However, if the end user terminal is found to be available to accept calls, at optional decision step 312, a determination is made whether any special user configurations at the destination end user terminals disallow the destination end user terminal from accepting incoming calls. If the destination end user terminal disallows incoming calls, the control is transferred to step 306. If the destination end user station does not disallow incoming call, at step 314, the destination end user terminal is ringed and if the user picks up the call, a voice communication channel is established between the source end user terminal and the destination end user terminal. In other embodiments, if the user does not pick up the incoming call, the incoming call may either be transferred to a voice mail associated with the destination phone number or the incoming call may also be transferred to the destination phone number through the second network. The destination end user terminal may provide necessary user interface to enable the user to manually transfer the call either to the voice mail or to the destination phone number. Alternatively, this transfer of the incoming call may be performed automatically through a default or user setting. For example, a user may configure the destination end user terminal to transfer all unattended calls to the voice mail automatically.

In another embodiment, a SIP based PBX (e.g., Microsoft Lync™, Cisco UCM™, Avaya PBX™, etc.) is coupled to the P2P server 106 through SIP trunking software (e.g., Skype Connect™). The PBX is registered with the communication server through a SIP profile. The SIP trunking software may be included in the communication server 106 or may exist on a separate server that is connected to the Internet 102 and communicatively coupled to the end-user terminals and the communication server 106. A plurality of desktop phones may be connected to the PBX. When a call to a PSTN or mobile number is initiated from any of the desktop phones, the process depicted in the flow diagram 300 is performed.

Similarly, when an end-user terminal 112*a* attempts to call a phone number, the communication server 106 or a gateway 108*a-c* attempts to determine whether the destination phone number is associated with a desktop phone that is connected to any of the registered SIP based PBXs. If yes, then the call is connected to the destination desk phone without using a second network (e.g., the PSTN or Mobile network 110). The SIP profile may also include user defined call termination configurations. For example, calls from PBX desktop phones to particular destinations can be configured to use the PSTN or mobile network 110 directly. Such selective termination of phone calls may be based on the calling rates to various destinations.

In yet another embodiment, a first PSTN phone user may dial a selected common PSTN phone number (e.g., a calling card number) or a selected code (e.g., a prefix "1101" or some preselected special character or a combination of numbers and characters such as '*' or '#') prior to dialing a second PSTN phone number. The selected common PSTN phone number or code is associated with a second network, wherein in this embodiment, the second network may be a packet based communication network. Typically, a PSTN phone user would dial the selected common PSTN phone number or the selected code that is associated with the second network when the user knows that the second PSTN phone number is in (or associated with) the second network. For example, the second PSTN phone number may be a Skype™ number associated with a Skype™ user.

Upon receiving the call from the first PSTN phone number through the selected dialing code or number, as stated above, the P2P server 106 or the gateway 108*a-c* would attempt to locate an end user terminal that is associated with the user of the second PSTN phone number and would perform step 310 and the optional step 312 (FIG. 3). If the end user terminal is available and configured to take calls, the call to the second PSTN phone number is connected to the end user terminal. Among others, one advantage of this method is that even though the second PSTN number may be a local number, the user (to whom the second PSTN phone number belongs to) may be out of the local calling area (e.g., the user may be in a foreign country). However, so long as the end user terminal associated with the user is connected to the packet based communication network coupled to the communication server 106, the call may be completed without incurring usual PSTN long distance or international charges.

In another embodiment, when the user dials a phone number from a PSTN landline phone using a "calling card" (e.g., either dialing a selected common PSTN phone number or a code that is associated with the second network), the call stays with the PSTN while only a location request is sent to the second network. The P2P server 106 or the gateway 108*a-c* in the second network attempt to locate the end point of the dialed call. If it is determined that the call end point is a PSTN network (that is, an end user terminal associated with the dialed phone number is not found in the active state in the network or the end user terminal is not found to be ready to accept phone calls), then the call is allowed to proceed as dialed and the call stays within the PSTN or mobile network.

In one other embodiment, when a caller dials a phone number using the selected common PSTN number (e.g., a calling card), the gateway 108a-c intercepts the call. The gateway 108a-c or the communication server 106 determines the identification of the user that is associated with the destination phone number. The communication server 106 or the gateway 108a-c then determines if the user is available through an end user terminal. Alternatively or if the user is not available to take the call through the end user station, the communication server 106 or the gateway 108a-c may also determine if the user has setup a temporary call forwarding. For example, if the user is travelling outside of the local calling area and may set a call forwarding to a local number. In this case, a gateway that is nearest (in terms of the calling cost) to the destination number is found and the call is transferred to the call forwarding number via the gateway and the PSTN or mobile network 110.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

We claim:

1. A method of placing an outgoing communication event to a destination phone number, comprising:
   receiving a notification of the outgoing communication event from an end user terminal;
   responsive to determining that the destination phone number is associated with a user of a first network, the first network being a packet based communication network:
      retrieving a user identification of the user of the first network corresponding to the destination phone number;
      retrieving presence information of a communication node in the first network associated with the user, the presence information comprising an indication of the user's availability and the configuration of the communication node to receive communication events;
      placing the outgoing communication event, using the retrieved user identification, to the communication node associated with the user in the first network based on the retrieved presence information;
   responsive to determining the destination phone number is not associated with any user in the first network:
      assigning a temporary outgoing identity to the end user terminal; and
      placing the outgoing communication event, using the temporary outgoing identity, to the destination phone number, in a second network.

2. The method of claim 1, wherein placing of the outgoing communication event to the destination phone number in the second network is performed through a communication gateway that is selected based on least communication tariff rates.

3. The method of claim 1, wherein, prior to the placing, determining if a configuration in the communication node disallows terminating a communication event that was intended to be terminated at the destination phone number in the second network, at the communication node.

4. The method of claim 1, wherein the presence information includes at least one of default configurations and user configurations related to accepting communication events that were originally intended to be terminated at the destination phone number in a second network.

5. The method of claim 1, wherein the retrieving the user identification includes searching in a list of contacts of a calling user that is stored locally at a calling end user station associated with the calling user.

6. The method of claim 5, wherein if the locally stored list of contacts does not include the user identification corresponding to the destination phone number, the retrieving the user identification further includes querying a communication server associated with the calling end user station for the user identification.

7. The method of claim 1, wherein the communication event is one of a voice call or a text message.

8. The method of claim 1, wherein the configuration of the communication node to receive communication events comprises an indication that components of the communication node are available or functioning properly.

9. A communication system, comprising:
   a plurality of end user terminals connected to a first network;
   a gateway coupled to the first network and a second network for interfacing the first network with the second network;
   one or more communication servers, at least one of the one or more communication servers and at least one of the plurality of end user terminals being configured to place an outgoing communication event to a destination phone number, the placing comprising:
      receiving a notification of the outgoing communication event from the one of the plurality end user terminals;
      responsive to determining that the destination phone number is associated with a user of the first network, the first network being a packet based communication network:
         retrieving a user identification of the user of the first network corresponding to the destination phone number;
         retrieving presence information of a communication node in the first network associated with the user, the presence information comprising an indication of the user's availability, and the configuration of the communication node to receive communication events;
         placing the outgoing communication event to the communication node associated with the user in the first network based on the retrieved presence information;
      responsive to determining the destination phone number is not associated with any user in the first network:
         assigning a temporary outgoing identity to the one of the plurality of end user terminals; and placing the outgoing communication event, using the temporary outgoing identity, to the destination phone number, in the second network.

10. The communication system of claim 9, wherein placing of the outgoing communication event to the destination phone number in the second network is performed through the gateway that is selected based on least communication tariff rates.

11. The communication system of claim 9, wherein, prior to the placing, determining if a configuration in the communication node disallows terminating a call that was intended to be terminated at the destination phone number in the second network, at the communication node.

12. The communication system of claim 9, wherein the presence information includes at least one of default configurations and user configurations related to accepting calls that were originally intended to be terminated at the destination phone number in a second network.

13. The communication system of claim 9, wherein the retrieving the user identification includes searching in a list of contacts of a calling user that is stored locally at a calling end user station associated with the calling user, wherein if the locally stored list of contacts does not include the user identification corresponding to the destination phone number, the retrieving the user identification further includes querying a communication server associated with the calling end user station for the user identification.

14. The communication system of claim 9, wherein the configuration of the communication node to receive communication events comprises an indication that components of the communication node are available or functioning properly.

15. A computer readable storage memory comprising stored instructions executable by one or more processors to perform an operation of placing an outgoing communication event to a destination phone number, the operation comprising:
   receiving a notification of the outgoing communication event from an end user terminal;
   responsive to determining that the destination phone number is associated with a user of a first network, the first network being a packet based communication network:
      retrieving a user identification of the user of the first network corresponding to the destination phone number;
      retrieving presence information of a communication node in the first network associated with the user, the presence information comprising an indication of the user's availability, and the configuration of the communication node to receive voice communication events;
      placing the outgoing communication event to the communication node associated with the user in the first network based on the retrieved presence information;
   responsive to determining the destination phone number is not associated with any user in the first network:
      assigning a temporary outgoing identity to the end user terminal; and
      placing the outgoing communication event, using the temporary outgoing identity, to the destination phone number, in a second network.

16. The computer readable storage memory of claim 15, wherein placing of the outgoing communication event to the destination phone number in the second network is performed through a communication gateway that is selected based on least communication tariff rates.

17. The computer readable storage memory of claim 15, wherein, prior to the placing, determining if a configuration in the communication node disallows terminating a call that was intended to be terminated at the destination phone number in the second network, at the communication node.

18. The computer readable storage memory of claim 15, wherein the presence information includes at least one of default configurations and user configurations related to accepting communication events that were originally intended to be terminated at the destination phone number in a second network.

19. The computer readable storage memory of claim 15, wherein the retrieving the user identification includes searching in a list of contacts of a calling user that is stored locally at a calling end user station associated with the calling user.

20. The computer readable storage memory of claim 19, wherein if the locally stored list of contacts does not include the user identification corresponding to the destination phone number, the retrieving the user identification further includes querying a communication server associated with the calling end user station for the user identification.

21. The computer readable storage memory of claim 15, wherein the configuration of the communication node to receive voice communication events comprises an indication that components of the communication node are available or functioning properly.

* * * * *